(12) United States Patent
Banatwala et al.

(10) Patent No.: US 9,104,848 B2
(45) Date of Patent: Aug. 11, 2015

(54) CROSS-PLATFORM AUTHENTICATION FROM WITHIN A RICH CLIENT

(71) Applicant: International Business Machines Corporation, Armonk, NY (US)

(72) Inventors: Mustansir Banatwala, Hudson, NH (US); Olgierd Stanislaw Pieczul, Dublin (IE); Stephen John Foley, Quincy, MA (US); Joseph Kubik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/889,915

(22) Filed: May 8, 2013

(65) Prior Publication Data

US 2014/0337953 A1   Nov. 13, 2014

(51) Int. Cl.
| | |
|---|---|
| G06F 21/00 | (2013.01) |
| G06F 21/31 | (2013.01) |
| G06F 21/41 | (2013.01) |
| G06F 21/33 | (2013.01) |
| H04L 29/06 | (2006.01) |

(52) U.S. Cl.
CPC ............... *G06F 21/31* (2013.01); *G06F 21/33* (2013.01); *G06F 21/41* (2013.01); *H04L 63/08* (2013.01)

(58) Field of Classification Search
CPC .......... G06F 21/31; G06F 21/41; H04W 6/12; H04L 63/08
See application file for complete search history.

(56) References Cited

U.S. PATENT DOCUMENTS

| | | | |
|---|---|---|---|
| 6,374,359 B1 | 4/2002 | Shrader et al. | |
| 2007/0174905 A1 | 7/2007 | Martherus et al. | |
| 2009/0013173 A1 | 1/2009 | Savage | |
| 2010/0057836 A1* | 3/2010 | Anbuselvan | 709/203 |
| 2011/0202989 A1* | 8/2011 | Otranen et al. | 726/8 |
| 2013/0014239 A1* | 1/2013 | Pieczul et al. | 726/7 |

* cited by examiner

*Primary Examiner* — Shewaye Gelagay
*Assistant Examiner* — Kendall Dolly
(74) *Attorney, Agent, or Firm* — Jeffrey S. LaBaw; David H. Judson

(57) ABSTRACT

An un-authenticated user attempts to access a protected resource at a Web- or cloud-based application from within a rich client. The client has an associated local HTTP server. Upon being refused access, a browser-based login dialog is opened automatically within an embedded browser panel. After receipt of the user's login credential in the panel, the browser passes the credential server application. If the user is authenticated, the browser-based dialog receives a cookie establishing that the user is authenticated for a session. The browser then automatically makes a request to the HTTP server, passing the cookie. Upon receipt of the request at the rich client HTTP server, the rich client saves the cookie in an associated data store, shuts down the login dialog, and re-issues the original request to the server, this time passing the cookie. The rich client, having provided the cookie, is then permitted to access the resource.

20 Claims, 3 Drawing Sheets

CROSS-PLATFORM AUTHENTICATION FROM WITHIN A RICH CLIENT

BACKGROUND OF THE INVENTION

1. Technical Field

This disclosure relates generally to application security and, in particular, to a method to enable a user to authenticate to a remote server application seamlessly from within a rich client.

2. Background of the Related Art

It is known in the prior art to integrate Web- or cloud-based applications with so-called "rich" clients, where a "rich" client is a client (of a client-server application) that supports its own interface (as opposed to merely exporting the web interface from the web application itself). A "rich" client typically is not browser-based, and it is sometimes referred to as a "thick" (as compared to a browser-based or "thin") client. An illustrative rich client is Lotus Notes®, which provides email, calendaring, contact management, and instant messaging. A rich client can be used to access and automatically perform actions on behalf of a user.

To enable access to data from a variety of applications, the first issue to be resolved is user authentication. If a user uses a desktop application to access the data on a remote server and then switches to another application, e.g., a browser, the authentication information associated with the session does not transfer easily from the desktop application to the browser, even though these applications run on the same machine Currently, the transition of authentication information from a desktop application to a browser (and for a Microsoft Windows based desktop) is done via SPNEGO (Simple and Protected GSSAPI Negotiation mechanism). Implementing such technologies, however, is a major barrier to entry for most enterprises. As a consequence, it is often necessary for passwords to be stored and maintained in multiple locations, which is undesirable from a security perspective. In addition, not all deployments just offer basic authentication; the problem of sharing a user's authentication information thus must also take into consideration those deployments that may be protected via a variety of alternative authentication mechanisms that the desktop application also has to understand if it is share the user's information appropriately and securely. These requirements can impact the adoption rate for the application and/or complicate its usage.

The problem of how to share a user's authentication information across local applications also exists for products that have desktop applications that ship along with a browser-accessible server. One known solution enables authentication of a rich client from within an existing browser session. In that approach, a user authenticates to a Web- or cloud-based application from a browser-based client. The browser-based client has an associated rich client. After a session is initiated from the browser-based client (and a credential obtained), the user can discover that the rich client is available and cause it to obtain the credential (or a new one) for use in authenticating the user to the application (using the rich client) automatically, i.e., without additional user input. An application interface provides the user with a display by which the user can configure the rich client authentication operation, such as specifying whether the rich client should be authenticated automatically if it detected as running, whether and what extent access to the application by the rich client is to be restricted, if and when access to the application by the rich client is to be revoked, and the like.

Although the above-described approach provides significant benefits, it may not be possible to include the rich client control panel UI or otherwise assume that the user starts from within a web browser session.

BRIEF SUMMARY

According to this disclosure, an un-authenticated user attempts to access a protected resource at a Web- or cloud-based application from within a rich client. The rich client has an associated local HTTP server, as well as an embedded browser. Upon being refused access, a browser-based login dialog is opened automatically within a web browser panel. After receipt of the user's login credential in the login dialog, the embedded browser passes the credential to the Web- or cloud-based application. If the user is authenticated, the browser-based login dialog receives a cookie or other authentication information (e.g., a token) establishing that the user is authenticated for a session. The embedded browser then automatically makes an HTTP GET request to the local HTTP server running on (or otherwise associated with) the rich client, passing the cookie or other authentication information. Upon receipt of the request at the rich client, the rich client saves the cookie in an associated data store, shuts down the login dialog, and re-issues the original request to the Web- or cloud-based application, this time passing the cookie received from the login dialog. The rich client, having provided the cookie, is then permitted to access the resource.

The above-described authentication method may be performed in an apparatus. The apparatus comprises a processor, and computer memory holding computer program instructions which, when executed, perform the method.

In another alternative embodiment, the authentication method is performed by a computer program product in a non-transitory computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
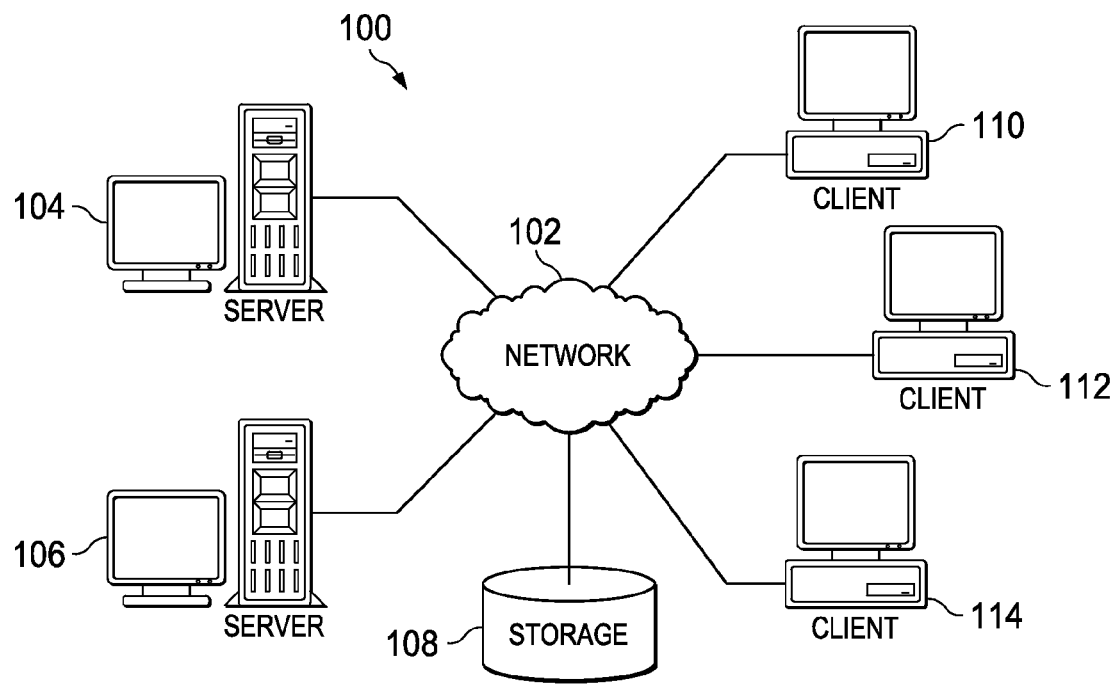
FIG. 1 depicts an exemplary block diagram of a distributed data processing environment in which exemplary aspects of the illustrative embodiments may be implemented.
Figure 2:
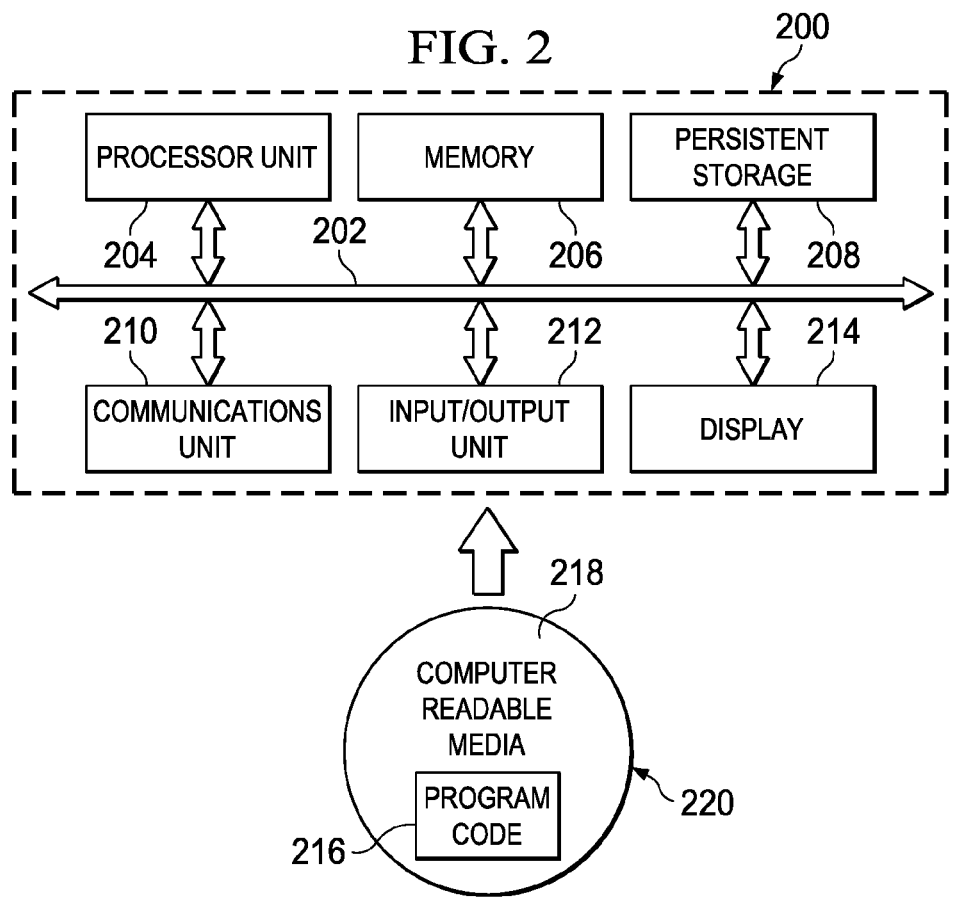
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As is well-known, and by way of additional background, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. Typically, an authentication is presented by a user as part of an authentication protocol sequence with an authentication server or service.

Figure 3:
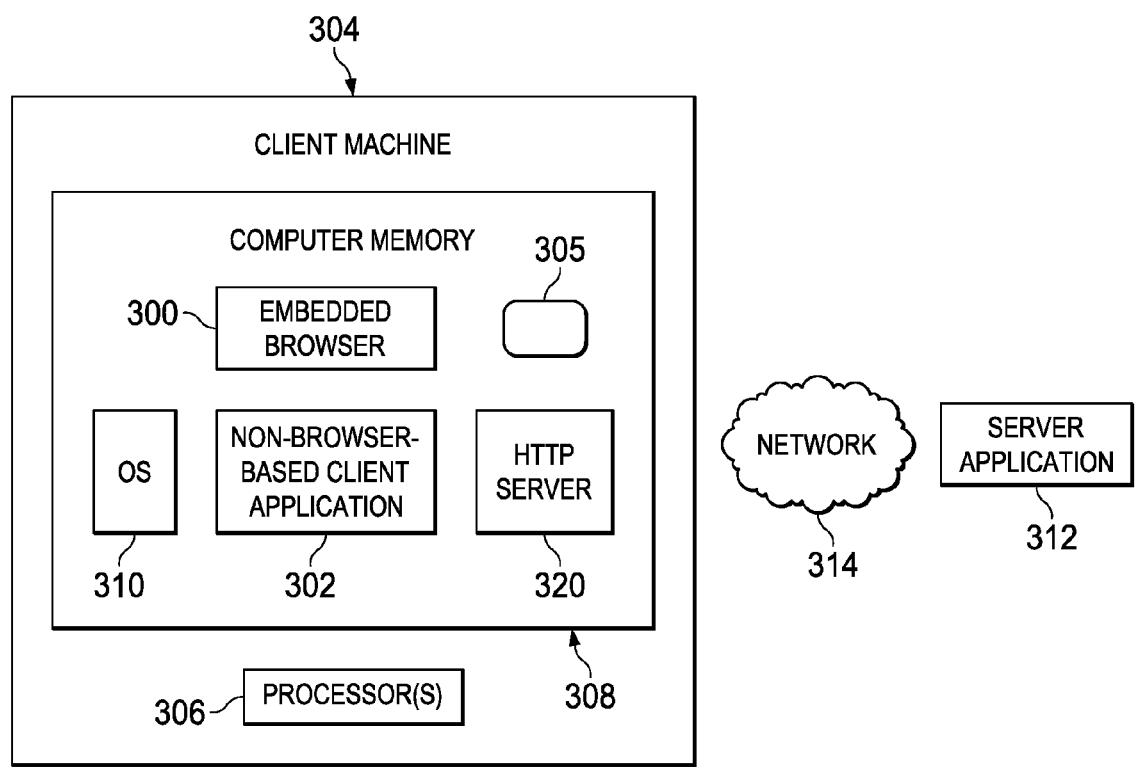
FIG. 3 illustrates a "rich client" and its associated Web- or cloud-based server-side application component.

FIG. 3 illustrates a basic operating environment in which the techniques of this disclosure may be implemented. The environment is one in which Web- or cloud-based application comprises client-side and server-side components. The client-side components execute in a client machine 304 having a hardware processor 306, computer memory 308, and operating system 310. A representative client machine is a data processing system such as such in FIG. 1. Within the computer memory 308, there is further provided a rich client (or non-browser-based client) 302. The rich client has associated therewith an HTTP server or daemon 320, and an "embedded" browser 300. In the context of this disclosure, an "embedded" browser is a software component that is available only to the rich client (which itself can invoke the browser, although typically no other component can do so). In other words, it is assumed that only the rich client has the capability of instantiating the browser for the purposes to be described herein. The browser 300 may be a web browser or code associated therewith (e.g., a browser plug-in, an applet, some other HTTP-based renderer, or a set of scripts/CSS/HTML). Each such client component is adapted to interoperate with the server-side component comprising server application 312 over network 314, such as shown in FIG. 1.

Server application 304 may be either Web-, or cloud-based and it also executes on one or more machines such as shown in FIG. 2.

Cross-Platform Authentication from within a Rich Client

With the above as background, the technique of this disclosure is now described. In this environment, it is assumed that a user of the rich client desires to obtain access to a protected resource (e.g., the server application), and to share his or her authentication information across one or more other applications operating in or in association with the client machine.

Figure 4:
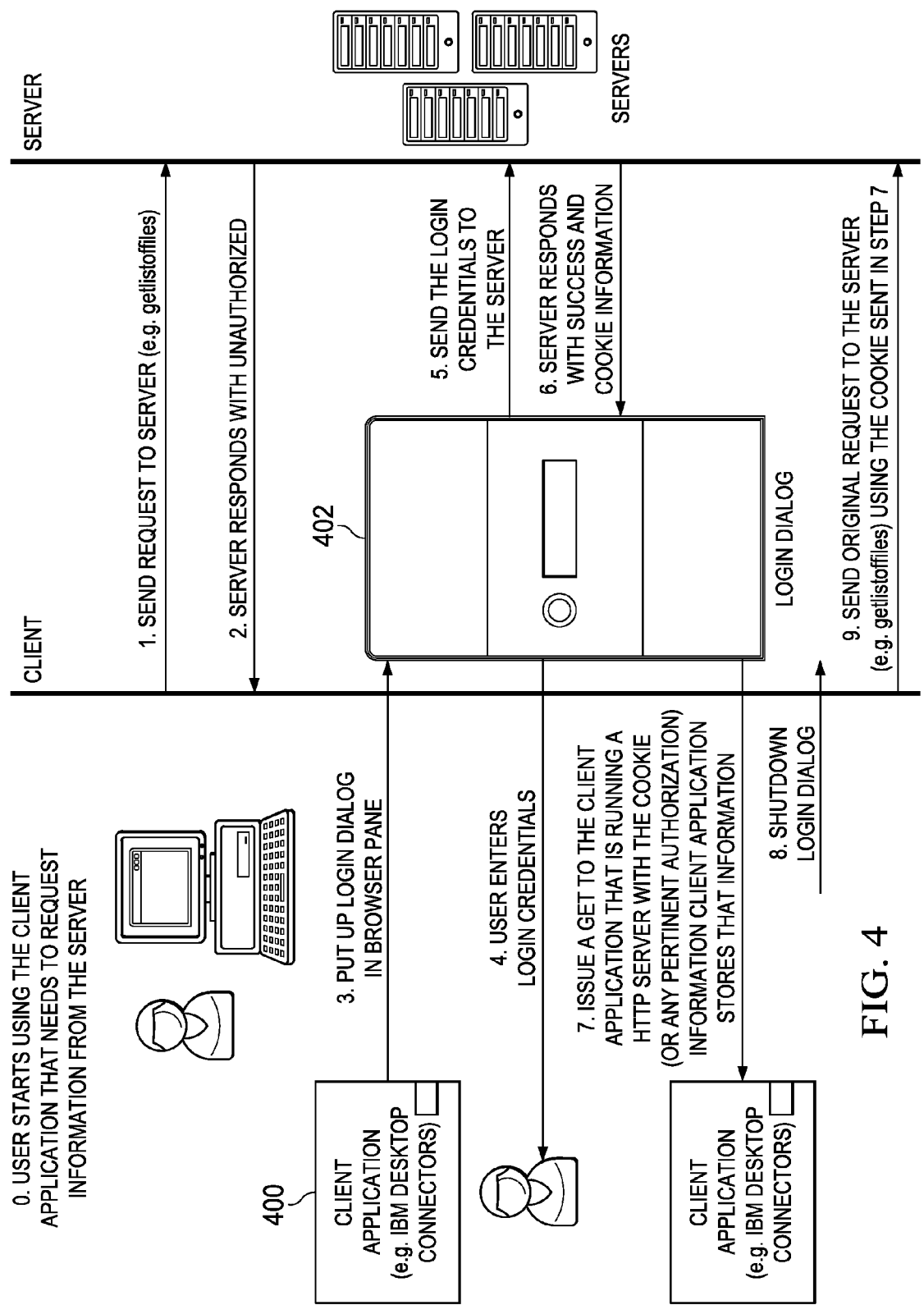
FIG. 4 is a process flow diagram describing the basic operating scenario of this disclosure.

In general, the basic operating scenario is as follows: an un-authenticated user attempts to access a protected resource at a Web- or cloud-based application 312 from the rich client 302. The rich client has the associated local HTTP server 320, and the embedded browser, as described above. Upon being refused access, a browser-based login dialog is opened automatically within a web browser 300 panel. After receipt of the user's login credential in the panel, the browser 300 passes the credential to the remote server application 312. If the user is authenticated by the server application (or some other component or system associated therewith), the browser-based dialog receives back a cookie 305 establishing that the user is authenticated for a session. According to this disclosure, the embedded browser 300 then automatically makes a request to the HTTP server 320, passing the cookie 305. Upon receipt of the request at the rich client HTTP server 320, the rich client saves the cookie in an associated data store (e.g., in memory, or on disk), shuts down the login dialog, and re-issues the original request to the server application 312, this time passing the cookie 305 that it received from the browser. The user, having provided the cookie, is then permitted to access the resource. This completes the processing FIG. 4 illustrates the scenario is more detail. As described above, the rich client 400 has associated therewith a local HTTP server daemon. A representative commercial product that implements this type of client-based HTTP daemon architecture is available as IBM® Lotus® Quickr™ Connectors. At step (0), the user starts using the rich client that needs to request information from the remote server. It is assumed that the information to be requested is "protected" in that access to the information is only permitted if the user is authenticated. At step (1), the user takes an action at the client (e.g., get a list of files), upon which the rich client sends a request to the remote server. Because the user is not yet authenticated, the server responds at step (2) with an "unauthorized" message or the like, denying access. In response to receiving this server response, the rich client automatically opens a local web browser and launches a login dialog 402 within that browser. The user, now seeing the login dialog, is then prompted to end his or her login credentials (e.g., user id and password, or any other authentication information). At step (4), the user enters his or her login credentials into the dialog. At step (5), the information entered by the user is automatically sent to the server (in a first request), typically in the form of an HTTP POST issued from the web browser. The server receives the login information and attempts to verify it in the usual manner. If the user is authenticated, the server returns to the web browser a response indicating successful authentication. This is step (6). The response from the server includes a cookie or other token indicating that the user is authenticated for a current session. At step (7), the browser issues a second request, but this time back to the client application HTTP server daemon. This second request typically is an HTTP GET request, sometimes referred to herein as a "dummy GET" request. Thus, the first request is directed to the remote server, the second request is directed back to the local HTTP server daemon associated with the rich client itself. The second request includes the cookie (or any other pertinent authentication information, such as a jsession id, keychain data, or the like) needed by the user to establish a right to access the protected resource. The authentication information may be time-restricted. Upon receipt of the second request and the associated cookie or other authentication information from the browser, the rich client saves the authentication information (in a local data store), shuts down the browser-based login dialog, and re-issues the original request back to the remote server. This is step (8). The re-issued request now includes the cookie or other authentication information that was absent from the original request that was sent to the remote server in step (1) above. The remote server receives the request and permits the requested access due to the inclusion of the cookie or other authentication information that had been absent previously.

The technique described above typically is used in a scenario where the end user is not working within the context of a standalone web browser (or otherwise has such a browser that is then-active). In addition, typically the rich client does not have associated therewith any type of control panel or other UI. The approach may also be used when the rich client has constraints on access to information that the user exchanges with one or more remote services. In the technique that has been described, (upon being denied access to a protected resource), the embedded browser within the rich client is opened and directed to a particular URL, thereby allowing the user to complete the authentication process if he or she can do so; if the user can authenticate successfully, the resulting authentication cookie is then automatically forwarded to the local http server provided by rich client.

The particular manner in which the rich client authenticates to the remote server application (and thus the particular browser login dialog) is not an aspect of this disclosure. Known techniques for this purpose include, without limitation, SAML-based authentication (in which the server issues a SAML assertion that is then forward to the rich client, which authenticates with the assertion or exchanges it for another credential), OAuth-based authentication (in which the server issues an OAuth token that is used by the rich client to authenticate), one-time token-based authentication (in which the server generates a random nonce that is kept server-side and associated with the user), SPNEGO (Simple and Protected GSSAPI Negotiation mechanism), two-factor form-based authentication, and the like. A representative login dialog (step (3) above) exposes a set of configuration elements, such as input fields, HTML fill-in forms, radio buttons, and the like.

The disclosed subject matter has many advantages. A key advantage is the user can be authenticated to the server application from within the rich client (through use of the embedded browser that is used to facilitate authentication and then operates to pass the resulting authentication information back to the rich client via the associated HTTP daemon). The embedded browser-based authentication dialog and the HTTP daemon facilitate (assist in) an automated authentication. The authentication dialog exposed by the embedded browser thus may vary depending on the nature and type of the authentication mechanism that is required by the server application. By using the embedded browser, the rich client has a dedicated mechanism by which it can facilitate the user's authentication and also a built-in control channel over which the authentication information can then be returned to the rich client (via the HTTP daemon). The embedded browser interacts with the HTTP daemon over conventional HTTP, or HTTPS, or some other equivalent transport.

The technique may be used with any rich client, irrespective of how that client authenticates to the server application.

This solution enables the user to log into the server application from within the rich client without having to do so using an existing web-based user session.

As used herein, the "credential" should be broadly construed to refer to any credential, token, data set or data that facilitates access to the server application. As noted above, the client (whether browser-based or rich) has an established authentication mechanism with its associated server application, and the disclosed technique honors the semantics and communication protocols involved.

The cross-platform authentication solution of this disclosure provides a unique interaction between the rich client and the Web- or cloud-based server application, an interaction that is facilitated using the embedded browser and the HTTP daemon. The solution does not require that an existing user session between the rich client and the server application is in place, in other words, that a credential has been previously generated when the end user logged into the server application.

Although not meant to be limiting, in a representative embodiment, the server application executes an application server (such as IBM® WebSphere® server), which includes support for one or more server-based code functions, typically in the form of J2EE-compliant servlets.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The rich client cross-platform authentication scheme described herein may be implemented in or in conjunction with various server-side architectures including simple n-tier architectures, web portals, federated systems, and the like. The application server component may be located in a domain that differs from the domain of one or more back-end applications and, thus, the techniques herein may be practiced in a loosely-coupled server (including a "cloud"-based) environment. The application server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the auto-login functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the client and server components as described are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the components that provide the rich client auto-login functionality.

The function(s) described may be implemented as an adjunct or extension to an existing application server function or operation.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, as noted above, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

As noted, the above-described rich client function may be used in any system, device, portal, site, or the like wherein a non-browser based client application credential needs to be passed to an associated browser process. More generally, the described technique is designed for use in any operating environment wherein given information (including, without limitation, credential data) is desired to be persisted from a client application to an associated browser process in an automated manner.

The server application enables access to a service, a server, an application program, a process, a page (e.g., a wiki, a web page, etc.), a file, a linked object, a directory, or the like.

Having described our invention, what we now claim is as follows:

1. A method of un-authenticated user access to a server application from within a rich client, the rich client having associated therewith an HTTP server, and an embedded browser available only to the rich client, comprising:
   upon receipt from the server application of a response denying access to a protected resource, the response being returned following an attempt by the un-authenticated user to access the protected resource from the rich client, automatically launching the rich client embedded browser to a login dialog, the login dialog adapted to receive login information from the user and to pass that login information to the server application to authenticate the user;
   upon receipt at the rich client HTTP server of a request from the rich client embedded browser, the request associated with authentication information indicating that the user has been authenticated to the server application as a result of the login information being passed from the rich client embedded browser to the server application, automatically closing the login dialog and issuing a new request to the server application for access to the protected resource, the new request having the authentication information associated therewith; and
   receiving the protected resource from the server application.

2. The method as described in claim 1 further including saving the authentication information.

3. The method as described in claim 1 further including issuing an original request to the server application, the response denying access being received in response to the original request.

4. The method as described in claim 1 wherein the authentication information is a cookie.

5. The method as described in claim 1 wherein the login dialog is located at a Uniform Resource Locator (URL) identifying a protected web page.

6. The method as described in claim 1 wherein the rich client embedded browser communicates with the rich client HTTP server securely.

7. The method as described in claim 1 further including invalidating the authentication information.

8. Apparatus to provide un-authenticated user access to a server application from within a rich client, comprising:
   a hardware processor;
   computer memory holding an HTTP server associated with the rich client, and an embedded browser available only to the rich client; and
   computer program instructions adapted to executed by the hardware processor, comprising:
      program code, operative upon receipt from the server application of a response denying access to a protected resource, the response being returned following an attempt by the un-authenticated user to access the protected resource from the rich client, to automatically launch the rich client embedded browser to a login dialog, the login dialog adapted to receive login information from the user and to pass that login information to the server application to authenticate the user;
      program code, operative upon receipt at the rich client HTTP server of a request from the rich client embedded browser, the request associated with authentication information indicating that the user has been authenticated to the server application as a result of the login information being passed from the rich client embedded browser to the server application, to automatically close the login dialog and to issue a new request to the server application for access to the protected resource, the new request having the authentication information associated therewith; and
      program code to receive the protected resource from the server application.

9. The apparatus as described in claim 8 wherein the computer program instructions further include program code to save the authentication information.

10. The apparatus as described in claim 8 wherein the computer program instructions further include program code to issue an original request to the server application, the response denying access being received in response to the original request.

11. The apparatus as described in claim 8 wherein the authentication information is a cookie.

12. The apparatus as described in claim 8 wherein the login dialog is located at a Uniform Resource Locator (URL) identifying a protected web page.

13. The apparatus as described in claim 8 wherein the computer program instructions enable secure communications between the rich client embedded browser and the rich client HTTP server.

14. The apparatus as described in claim 8 wherein the computer program instructions further include program code to invalidate the authentication information.

15. A computer program product in a non-transitory computer readable medium executing in a data processing system to provide un-authenticated user access to a server application from within a rich client, the rich client having an associated HTTP server and an embedded browser available only to the rich client, the computer program product holding computer program instructions which, when executed by the data processing system, perform a method comprising:
   upon receipt from the server application of a response denying access to a protected resource, the response being returned following an attempt by the un-authenticated user to access the protected resource from the rich client, automatically launching the rich client embedded browser to a login dialog, the login dialog adapted to receive login information from the user and to pass that login information to the server application to authenticate the user;
   upon receipt at the rich client HTTP server of a request from the rich client embedded browser, the request associated with authentication information indicating that the user has been authenticated to the server application as a result of the login information being passed from the rich client embedded browser to the server application, automatically closing the login dialog and issuing a new request to the server application for access to the protected resource, the new request having the authentication information associated therewith; and receiving the protected resource from the server application.

16. The computer program product as described in claim 15 wherein the method further includes saving the authentication information.

17. The computer program product as described in claim 15 wherein the method further includes issuing an original request to the server application, the response denying access being received in response to the original request.

18. The computer program product as described in claim 15 wherein the authentication information is a cookie.

19. The computer program product as described in claim 15 wherein the login dialog is located at a Uniform Resource Locator (URL) identifying a protected web page.

20. The computer program product as described in claim 15 wherein the rich client embedded browser communicates with the rich client HTTP server securely.

* * * * *